July 15, 1930.
F. A. PARSONS
MILLING MACHINE TRANSMISSION
AND CONTROL MECHANISM
Re. 17,734
8 Sheets-Sheet 1
Original Filed Dec. 26, 1924
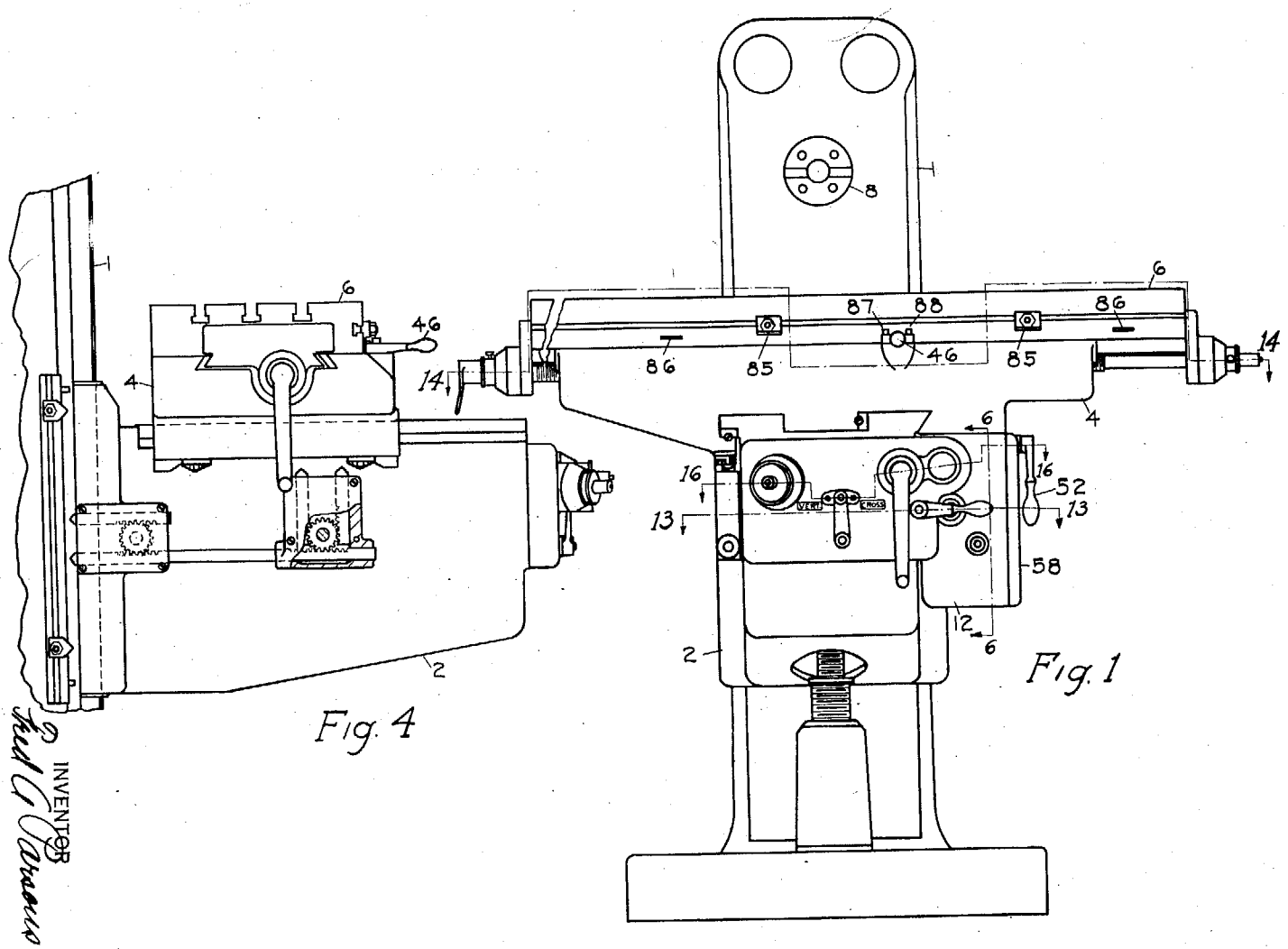
INVENTOR
Fred A Parsons July 15, 1930.
F. A. PARSONS
MILLING MACHINE TRANSMISSION
AND CONTROL MECHANISM
Re. 17,734
8 Sheets-Sheet 2
Original Filed Dec. 26, 1924
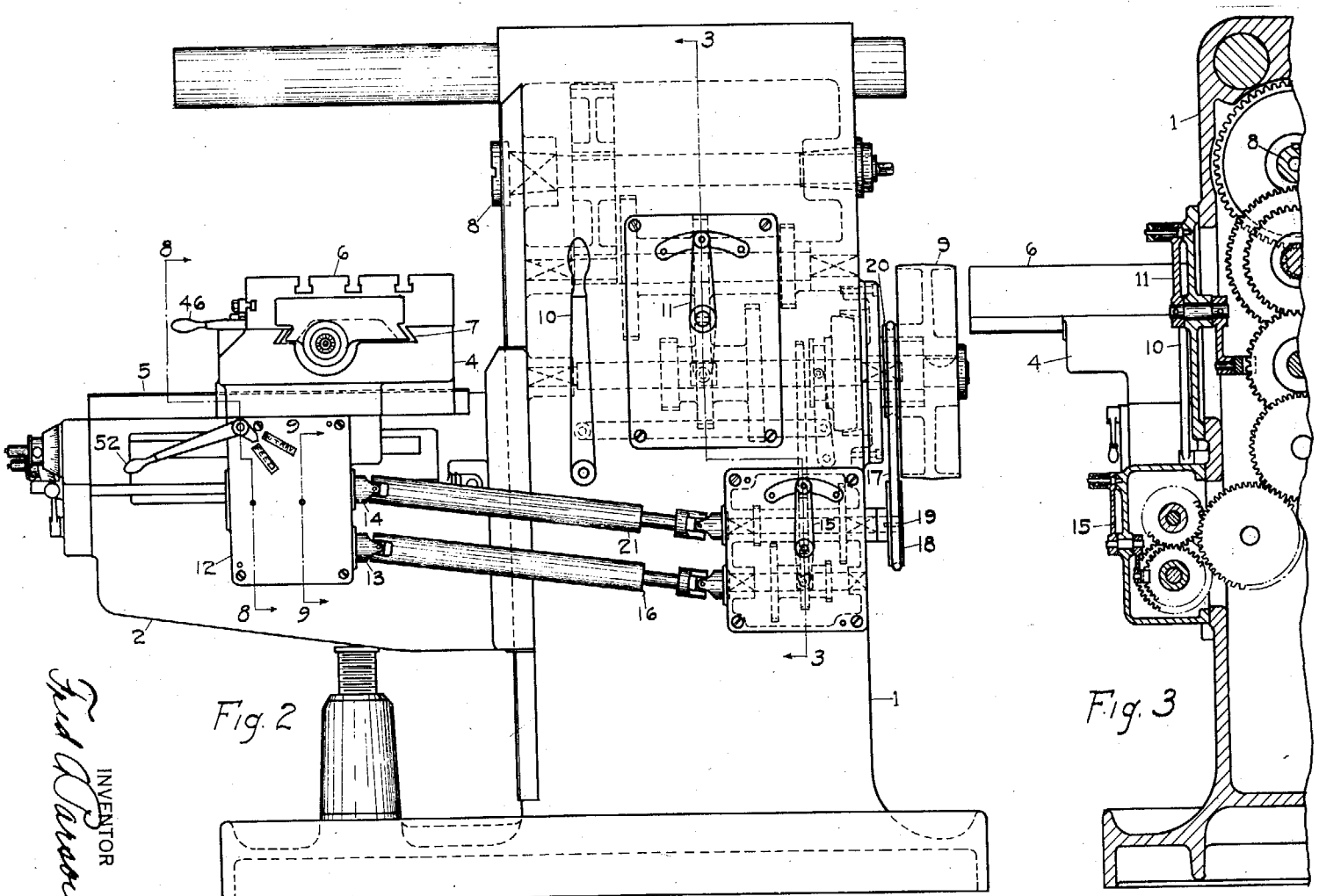
INVENTOR
Fred A. Parsons July 15, 1930.

F. A. PARSONS
MILLING MACHINE TRANSMISSION
AND CONTROL MECHANISM

Re. 17,734
8 Sheets-Sheet 3

Original Filed Dec. 26, 1924

INVENTOR
Fred A. Parsons

July 15, 1930.

F. A. PARSONS
MILLING MACHINE TRANSMISSION
AND CONTROL MECHANISM

Re. 17,734
8 Sheets-Sheet 4

Original Filed Dec. 26, 1924

INVENTOR
Fred A. Parsons

July 15, 1930.

F. A. PARSONS
MILLING MACHINE TRANSMISSION
AND CONTROL MECHANISM

Original Filed Dec. 26, 1924

Re. 17,734
8 Sheets-Sheet 5

INVENTOR
Fred A Parsons

July 15, 1930.

F. A. PARSONS
MILLING MACHINE TRANSMISSION
AND CONTROL MECHANISM

Re. 17,734
8 Sheets-Sheet 6

Original Filed Dec. 26, 1924

INVENTOR
Fred A. Parsons

July 15, 1930.

F. A. PARSONS
MILLING MACHINE TRANSMISSION
AND CONTROL MECHANISM

Re. 17,734
8 Sheets-Sheet 7

Original Filed Dec. 26, 1924

INVENTOR
Fred A. Parsons

July 15, 1930.

F. A. PARSONS
MILLING MACHINE TRANSMISSION
AND CONTROL MECHANISM

Re. 17,734
8 Sheets-Sheet 8

Original Filed Dec. 26, 1924

INVENTOR
Fred A. Parsons

Reissued July 15, 1930 Re. 17,734

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN, A CORPORATION OF WISCONSIN

MILLING-MACHINE TRANSMISSION AND CONTROL MECHANISM

Original No. 1,718,067, dated June 18, 1929, Serial No. 758,052, filed December 26, 1924. Application for reissue filed March 22, 1930. Serial No. 438,248.

This invention relates to improvements in a milling machine transmission and control mechanism.

The main purpose of this invention relates to milling machines having relative work and cutter movements in more than one direction or path, and in which are provided means for the relative traversing of the work and cutter, both at a variable pre-determined feed rate and at a constant power rapid traverse rate.

In such machines as ordinarily constructed both the feed rate and rapid traverse rate are the same for the different paths of movement. I have found it desirable that different paths should have different rates; for instance, that the rapid traverse rate in the one path or course should be different than for others, and that the difference in the rapid traverse rate should not be followed by corresponding differences in the feed rate.

A very important purpose of my present invention is to accomplish the above result by the means of control members which are operably the same as the control members for machines not embodying the desirable feature of different rates in the different paths.

A further important purpose is to provide transmission and control mechanism whereby different rates may be obtained, as above explained, in a plurality of paths while still maintaining a single shift-lever operative for the change from feed to power rapid traverse rate for all of the paths or courses.

A further purpose is to produce the desired different ratios or rates in the different paths through the medium of transmission mechanism having clutches in serial relation whereby a given control lever may be shifted in the one or the other direction to determine the direction of actuation of the table in one of its paths or courses and another lever may be shifted in the one or the other direction to determine whether the actuation shall be at a feed or power quick traverse rate.

A further purpose relates to the accomplishment of the main purpose by means permitting reverse levers individual to certain paths or courses while other paths or courses may be controlled by a common reverser, yet all the reversers and the mechanism controlled thereby may have their rates changed from feed to power rapid traverse or vice versa simultaneously and by the means of a single control element.

A further purpose relates to the simplification and improvement of the transmission mechanism and of the control mechanism of a milling machine in which the rates for feed movement and for rapid traverse movement are established independently for two or more paths.

Another object is generally to simplify and improve the construction and operation of the transmission and control mechanism of milling machines.

Other objects will be apparent in part from the accompanying drawings and in part from the accompanying specification and claims. My invention therefore consists in the construction, arrangement, and combination of parts as hereinafter particularly shown, described and pointed out in the accompanying drawings, specifications, and claims, and in various equivalent embodiments thereof, it being understood that the invention may be embodied in a variety of forms.

In the accompanying drawings, like reference characters denote like parts throughout the several views in which:

Figure 1 is a front elevation or view from the operative side of a milling machine of the type commonly known as a knee and column type, and which embodies my invention.

Figure 2 is a side elevation of the machine as viewed from the right of Figure 1.

Figure 3 is a partial sectional elevation taken along line 3—3 of Figure 2.

Figure 4 is an enlarged side elevation from the left of Figure 1 of the vertically movable unit consisting of the supports or parts commonly termed knee, table, and saddle, and showing a portion of the main support or column.

Figure 11 is a fragment of the control mechanism in the saddle box previously referred to.

Figure 5:
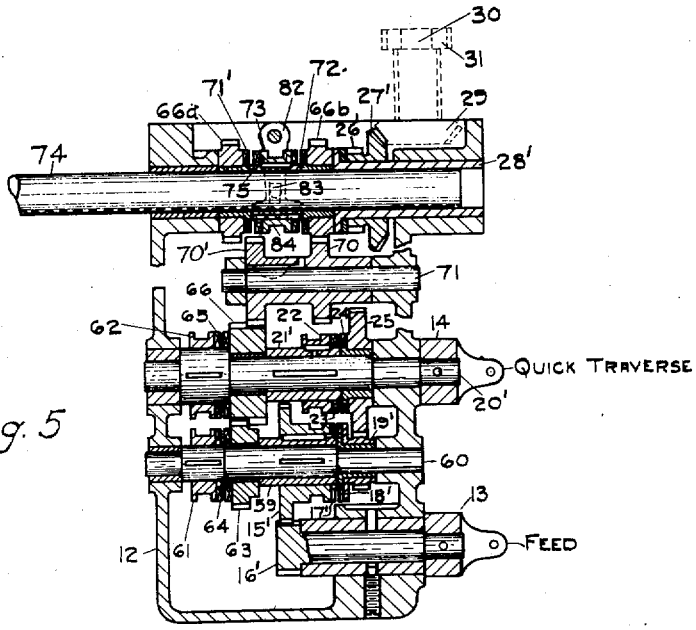
Figure 5 is a development of certain gearing contained in the small box-like housing or unit shown fixed to the saddle in Figure 2, and the development being taken along line 5—5 of Figure 8.
Figure 7:
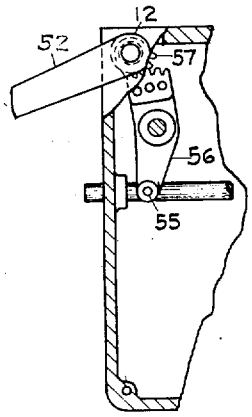
Figure 7 is a view partially in section of a portion of the same housing to illustrate certain details of the control mechanism.

The milling machine embodies a column or main support 1 supporting a knee or intermediate support 2 vertically slidable on suitable ways on the column. Slidable toward and from the column on the knee 2 is a saddle or intermediate support 4, suitable ways or slides being provided for this purpose; and slidable on the saddle 4 is a table or work support 6 having suitable guiding surfaces providing a slide transversely to the slides or ways previously described, the various slidable members combining to form a support for the table 6 from the column 1 and providing table movement in three transverse directions, through the relative movement of the several support members.

Rotatably mounted in the column 1 is a spindle 8, and supported from the column for rotation is a driving pulley 9 forming a source of power for the mechanism embodied in the machine. Intermediate between the spindle 8 and the drive pulley 9, is a clutch controlled by a hand lever 10 and suitable transmission gearing for obtaining a variety of spindle speeds, similar in the present embodiment to the mechanism which I have previously described and shown in a preceding application, Serial Number 733,341, filed August 21, 1924. Choice of the various speeds is controlled by a lever 11.

On the saddle 4, and fixed for movement therewith, is a housing or box member 12 which rotatably supports a feed element 13 and a power rapid traverse element 14. The feed element 13 may be driven from the pulley 9 at a plurality of rates, determined by the operator, by the manual movement of a lever 15, power being transmitted to the member 13 through the intermediate agency of a universal joint shaft designated by the number 16, which provides for the maintaining of an operative connection in spite of the movement of the saddle 4, in a manner and by the means of transmission and feed change mechanism similar to that previously disclosed in the above-named application for the driving of a similar feed member.

Constant power rapid traverse movement is transmitted from the pulley 9 to the power rapid traverse element 14, by the means of a round belt 17 engaging both with a pulley 18 on a shaft 19 and also with a pulley 20 on the hub of the pulley 9, and through the intermediate agency of a universal joint shaft 21, providing for relative saddle movement and through other transmission mechanism—all in a manner and by the means of mechanism disclosed in the above-named preceding application for the driving of a similar rapid tranverse member.

The transmission mechanism for the spindle and for the rotation of the feed element 13 and rapid traverse element 14 being similar to the mechanism employed and described for similar purposes in the above-named preceding application, the description of such mechanism will not be repeated here.

I will now describe the transmission mechanism leading from the elements 13 and 14 to the table 6.

From the feed element 13 (see Fig. 5), power is transmitted to a gear 15′ through a pinion 16′ on the extended stem of which the member 13 is fixed. The gear 15′ is provided with an extended hub having clutch teeth 17′ adapted to engage, when the gear 15′ is shifted in the proper direction, with clutch teeth 18′ fixed with a pinion 19′, the pinion 16′ being made of sufficient width to permit the shifting of the gear while still retaining operative engagement.

Figure 6:
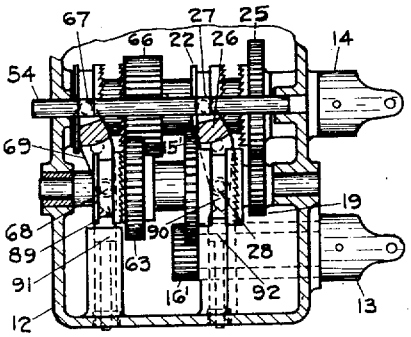
Figure 6 is an enlarged vertical section through the same housing along line 6—6 of Figure 1.
Figure 9:
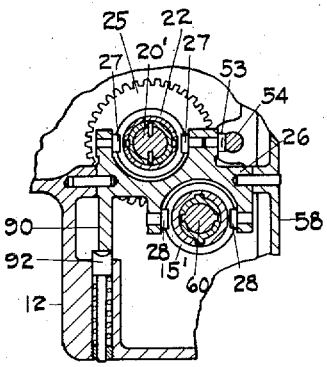
Figure 9 is an enlarged partial section taken along the line 9—9 of Figure 2 to illustrate certain details of the control mechanism.

The quick traverse element 14 is fixed with a shaft 20′ journaled in the box 12, to which is keyed a sleeve 21′; and upon the sleeve 21′ is slidably keyed a clutch member 22 having clutch teeth 23 adapted, when the clutch element 22 is shifted in the proper direction, to engage with clutch teeth 24 on a gear 25. The gear 15′ and the clutch member 22 are interconnected for simultaneous movement by the means of a lever 26, (see Figs. 6 and 9), the opposite ends of which carry pivoted shoes 27 and 28 engaging in suitable grooves in the member 22 and the hub or shank of the gear 15′ respectively, thereby the shifting of clutch teeth 23 into engagement with the clutch teeth 24, will simultaneously disengage clutch teeth 17′ and 18′, and vice versa. Should the clutch teeth 17′ be engaged with the clutch teeth 18′, the gear 25 will be driven through the pinion 19′ at a slow or feed rate; while should the clutch teeth 23 be engaged with the clutch teeth 24, the gear 25 will be driven at a comparatively rapid and constant quick traverse rate.

Figure 15:
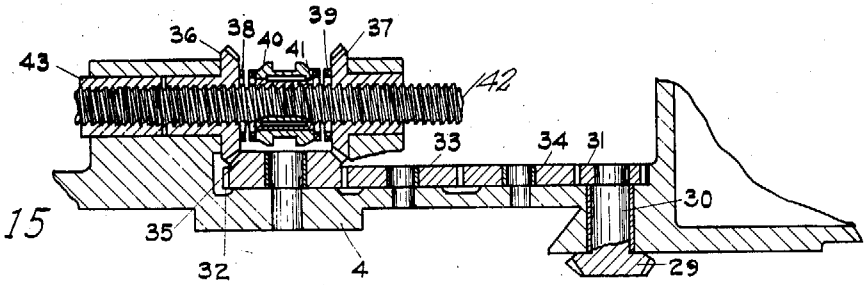
Figure 15 is a sectional elevation representing a development of gearing along the line 15—15 of Figure 14.

The gear 25 is permanently meshed with a gear 26′ fixed with a bevel gear 27′ for rotation on a sleeve 28′ which is fixed in the box or housing 12. Although in Fig. 5, the gear 25 is not shown meshed with the gear 26′, Fig. 5 being a developed section in which the shafts are shown spaced apart for convenience, it will be apparent from Fig. 8, where the shafts are shown in true position, that the gears are meshed as described. Meshing with the bevel gear 27′ is a bevel gear 29 on the stem 30 of which is fixed a spur gear 31 in the saddle 4. The gear 31 drives a spur gear 32 (see Fig. 15) through a train consisting of intermediate gears 33 and 34. Fixed with the gear 32 is a bevel gear 35 meshing with the oppositely disposed bevel gears 36 and 37 respectively provided with clutch teeth 38 and 39 adapted for engagement with complementary clutch teeth on an intermediate clutch member or spool 40 slidably keyed on a sleeve 41, which in turn is slidably keyed with the table screw 42.

If the gear 25 is actuated, it will be apparent that the bevel gears 36 and 37 will be actuated in opposite directions; and accordingly as the clutch member 40 is shifted to engage with the teeth 38 or 39 of the respective bevel gears, the screw 42 will be actuated in the one or the other direction. The screw 42 is provided with a nut 43 fixed in the saddle 4, and the ends of the screw are journaled for rotation in table 6 and the screw is fixed for axial movement with the table 6 in the usual manner whereby a rotation of the screw 42 in the one or the other direction will cause opposite movement of the table in the saddle.

Figure 10:
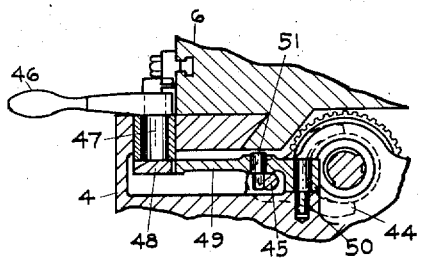
Figure 10 is a vertical section through a portion of the table and saddle along the line 10—10 of Figure 14.
Figure 11:
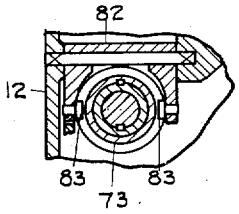
Figure 12:
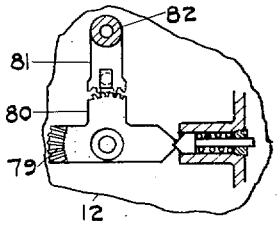
Figure 12 represents a section along line 12—12 of Figure 8 showing a portion of the control mechanism in the saddle box.
Figure 14:
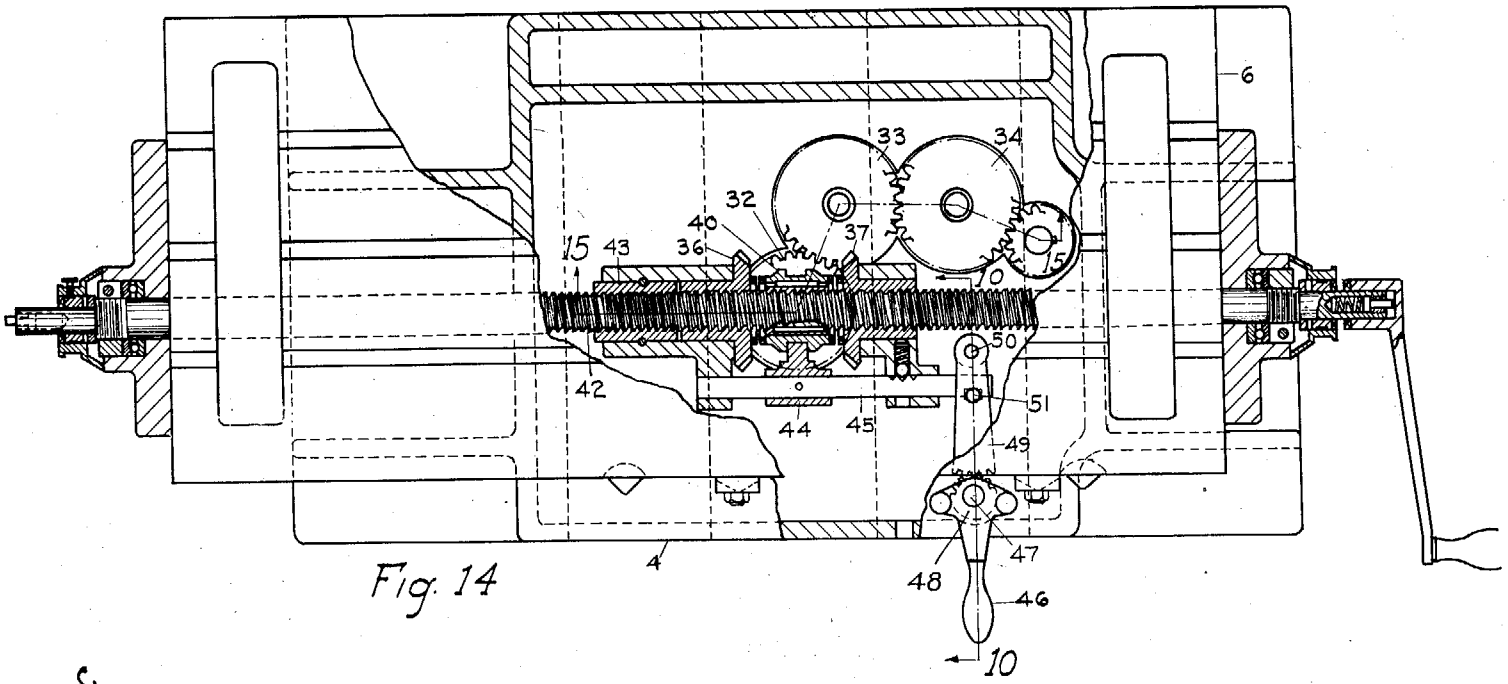
Figure 14 is an enlarged plan view of the table partially in section along the line 14—14 of Figure 1.

For the shifting of the clutch member 40, a fork 44 engages a suitable groove in the clutch member and is fixed for movement with a rod 45 which may be shifted in the one direction or the other by the means of a hand lever 46 through the medium of the stem 47 on which the lever is fixed and which has a head 48 engaging through suitable gear teeth cut in the head 48, a segment 49 pivoted in the saddle on a pin 50, and having fixed for movement therewith a pin 51 engaging a notch or groove in the rod 45, as particularly shown in Figs. 10 and 14.

The pivoted lever 26 is connected to be moved by hand lever 52 by means of a pivoted shoe (see Fig. 8) 53 mounted in lever 26 and engaging with a slot on the one side of a slidable rod 54, the other side of the rod being provided with a slot engaged by a shoe 55 pivoted in a swinging member or lever 56, the opposite end of which is provided with gear teeth meshing with a segment 57 journaled in the cover 58 of the housing 12 and on the stem of which the handle 52 is fixed.

From the foregoing it will be apparent that the clutch member 40 together with associated parts constitutes a reverser, whereby the table may be actuated in either direction at the will of the operator, accordingly as the hand lever 46 is shifted in the one or the other direction, and either at a variable feed rate or at constant power rapid traverse rate as may be determined by the operator through the shifting of the lever 52; and owing to the arrangement of the transmission elements, the relative rate of the feed and power rapid traverse for any given rates of the respective members 13 and 14 is determined by the ratio of the gears 19′ and 25. Since the gear 25 is considerably larger than the gear 19′, the quick traverse will be relatively fast. The quick traverse drive to the table constitutes a train or branch line including the quick traverse clutch or element 22 and a reverser consisting of the clutch member 40 together with its associated parts, the train being individual to the table and the reverser being in serial driving relationship with the quick traverse element, that is to say power derived from the one is transmitted through the other. The alternative feed drive to the table similarly constitutes a train or branch line individual to the table in which the feed member or gear 15′ and the reverser are in serial driving relationship.

I will now describe the mechanism by which the feed and power rapid traverse is applied to the cross and vertical movements:

The gear 15′ previously described, is slidably keyed to a sleeve 59 which in turn is fixed with a shaft 60 journaled in the housing 12. The shaft 60 is therefore driven at a feed rate and as previously noted, the shaft 20′ is driven at a quick traverse rate. Slidably mounted upon the respective shafts are the clutch elements or spools 61 and 62. The clutch element 61 is provided with clutch teeth 64 and a gear 63 rotatably mounted upon the shaft 60 is provided with complementary clutch teeth adapted to be engaged and driven by the clutch teeth 64 as the element 61 is shifted in a suitable direction. The clutch element 62 is similarly provided with clutch teeth 65 and a gear 66 rotatably mounted upon the shaft 20′ is provided with complementary clutch teeth adapted to be engaged and driven by the clutch teeth 65 as the element 62 is suitably shifted. The clutch elements 61 and 62 are interconnected for simultaneous movement by the means of clutch shoes 67 and 68 pivoted in a clutch lever 69, whereby, as the clutch teeth 64 are engaged, the clutch teeth 65 will be withdrawn from engagement and vice versa.

The gears 63 and 66 mesh together, whereby if the clutch teeth 64 are engaged with the mating clutch teeth in the gear 63, the gear 66 will be driven at a feed rate; while if the clutch teeth 65 engage with the mating clutch teeth in the gear 66, the gear 66 will be driven at a quick traverse rate. Rotatably mounted on a rotatable shaft 74 are clutch gears 66ᵃ and 66ᵇ which, when gear 66 is actuated, will be oppositely driven, the gear 66ᵃ being meshed directly with the gear 66 and the gear 66 being driven through the medium of the gears 70 and 70′ fixed with the shaft 71 journaled in the housing 12,—the effect of the arrangement being to transmit opposite motion to the gears 66ᵃ and 66ᵇ. Although in Fig. 5 the gear 66ᵃ is not shown meshed with the gear 66, Fig. 5 being a developed section as previously explained, it will be apparent from Fig. 8, where the shafts are shown in true position that the gears are meshed as described.

The gear 66ᵃ is provided with clutch teeth 71′, and the gear 66ᵇ is provided with clutch teeth 72. Intermediate between the gears is a clutch member 73 having clutch teeth at its opposite ends respectively complementary to the clutch teeth of the respective gears. The clutch member 73 is slidably mounted to transmit motion to the shaft 74 through the medium of a sleeve 75 keyed with the clutch member 73 and which is in turn keyed to the shaft, provision being made for the shaft to slide through the sleeve 75 and through the bearings of the shaft in the housing 12.

The clutch member 73 together with associated parts constitutes a reverser whereby the feed or quick traverse motion selectively transmitted to the gears 66ᵃ and 66ᵇ, as previously described, may be transmitted to the shaft 74 in either direction, accordingly as the clutch element 73 is shifted in the one or the other direction to engage the teeth 71 or 72. This shifting may be manually accomplished by the means of a hand lever 76 (see Fig. 13) fixed at the front of the knee on the end of a spline shaft 77 engaging with a bevel segment 78 journaled in the box 12, whereby the segment may be turned by the movement of the hand lever when the saddle and the box or housing 12 fixed thereon are in any of their positions of cross adjustment on the knee.

The bevel segment 78 meshes with a complementary segment 79 having an arm 80 (see Fig. 8), provided with gear teeth engaging suitable gear teeth on an arm 81 of a pivoted fork 82 which is provided with pivoted clutch shoes 83 engaging an annular groove 84 in the clutch member 73. It will thus be seen that the arrangement is such that when the lever 76 is moved in the one direction, the clutch member 73 will engage with and be driven by the teeth 71′; and when moved in the other direction, the clutch member 73 will be engaged with and driven by the clutch teeth 72 in the opposite direction; and when the lever is moved to a central position, the clutch 73 will be disengaged, thus providing either a forward reverse, or stop for the shaft 74.

Figure 8:
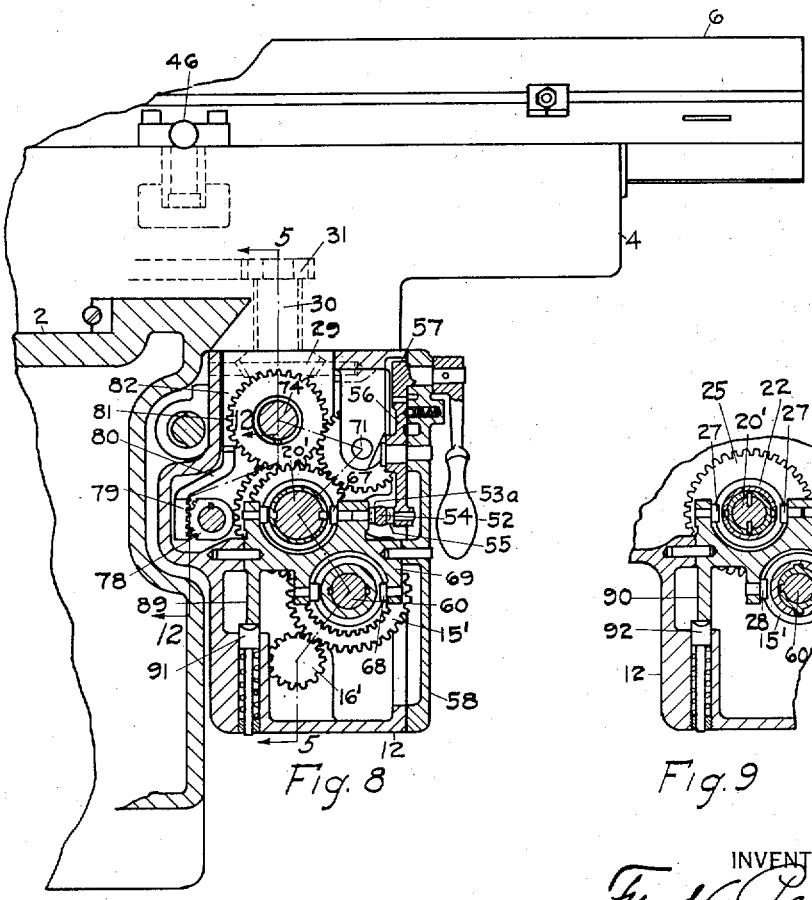
Figure 8 is a partial sectional elevation along line 8—8 of Figure 2, and enlarged.
Figure 13:
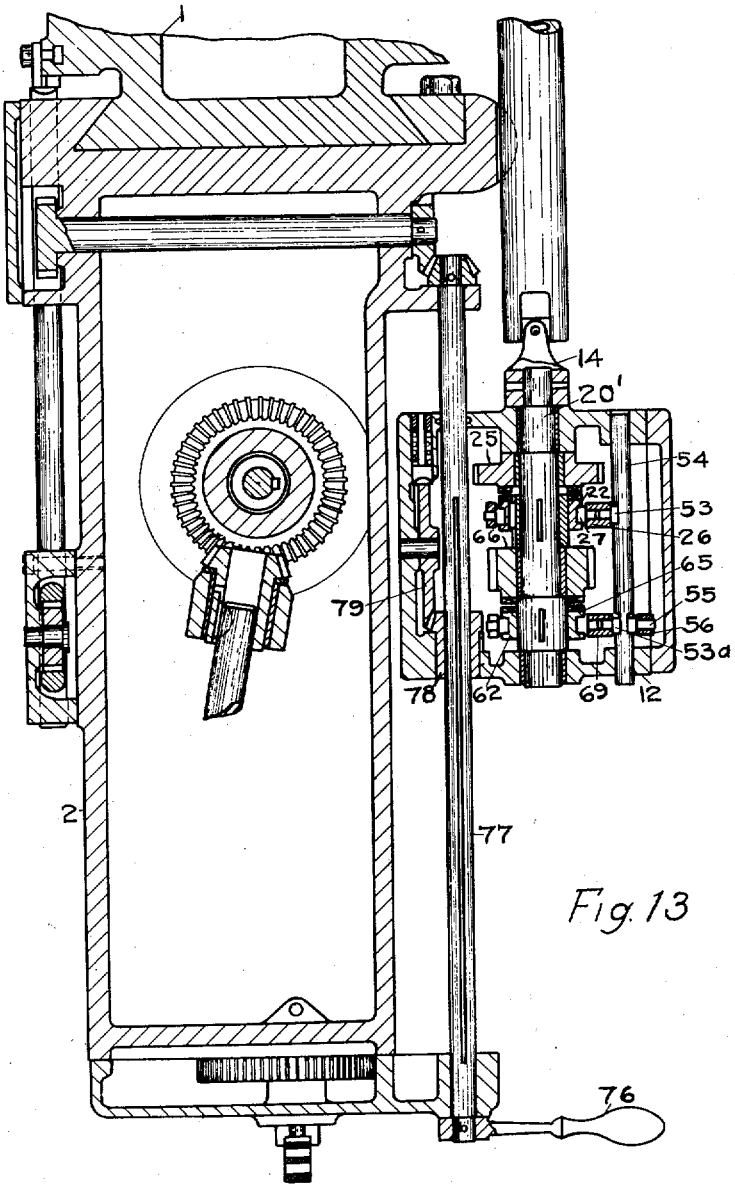
Figure 13 is an enlarged horizontal section through the knee and saddle box taken along the line 13—13 of Figure 1.

The same hand lever 52 which controls feed or rapid traverse to the table, is likewise effective to simultaneously control the clutch elements 61 and 62, and therefore determine feed or rapid traverse to the shaft 74, the rod 54 being connected to operate the clutch control lever 69 by the means of a slot in the rod and a pivoted shoe 52ᵃ in the clutch member in a manner precisely similar to the control by the rod of the clutch member 26, as more particularly shown in Figs. 8 and 13.

Figure 16:
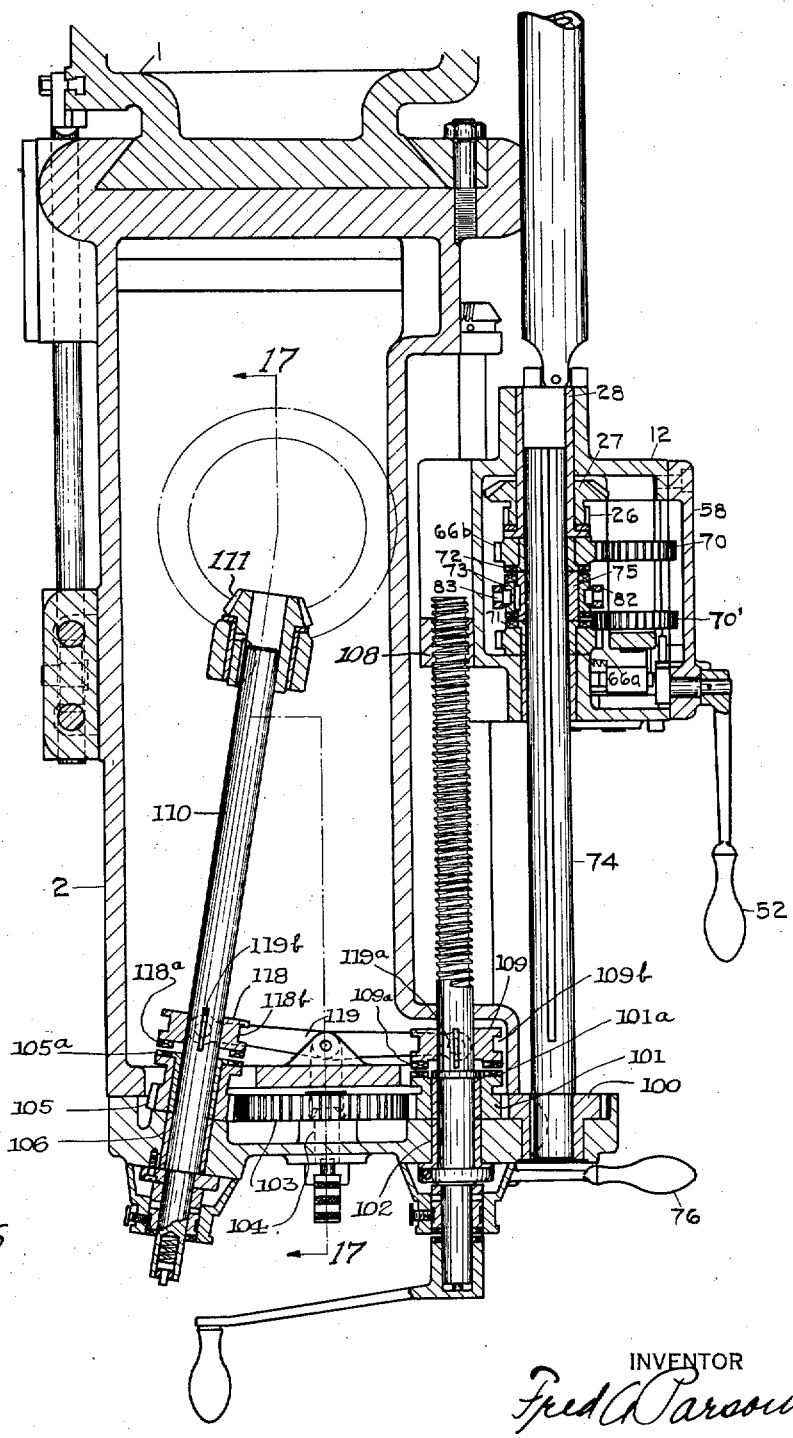
Figure 16 is an enlarged horizontal section through the knee and saddle box along the line 16—16 of Figure 1.
Figure 17:
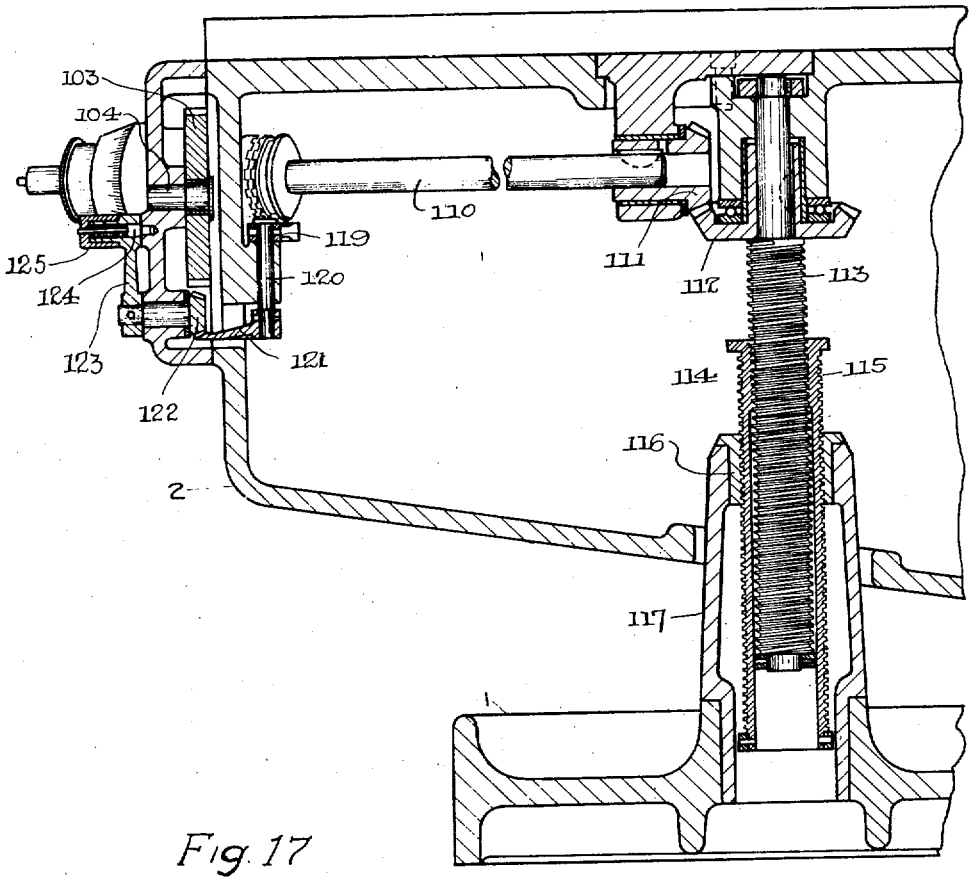
Figure 17 is a vertical section through the front portion of the knee and base of the machine along the line 17—17 of Figure 16.

The shaft 74, when driven, may selectively drive either the cross or vertically movable supports by the means of mechanism which will now be described. Fixed on the front end of shaft 74 is a gear 100 (see Fig. 16) meshing with a gear 101 rotatably supported on a sleeve 102. Gear 101 drives a gear 103 supported for rotation on a stud 104 and meshing with an angular gear 105 rotatably supported on a sleeve 106. By the means of the mechanism above described both gear 101 and gear 105 are driven in either direction either at a feed or rapid traverse rate, accordingly as shaft 74 is driven. Supported in a suitable bore in the sleeve 102 is a screw 107 co-axial with the gear 101. The screw 107 is rotatable but fixed against axial movement relative to the knee 2, and its threaded portion engages a threaded bore 108 fixed for movement with saddle 4. A clutch member 109 slidably keyed on the screw is shiftable to engage or to disengage clutch teeth 109ᵃ with complementary clutch teeth 101ᵃ on the gear 101. If the clutch teeth are engaged the saddle may, by the mechanism described be driven from shaft 74 to travel in either direction and at a feed or rapid traverse rate accordingly as shaft 74 is so driven. A shaft 110 is rotatably supported in the bore of sleeve 106 in axial alignment with gear 105. Fixed on shaft 110 is a bevel gear 111 meshed with a bevel gear 112 (see Fig. 17) fixed on the inner screw 113 of a telescopic screw of well known construction generally denoted by the numeral 114, the outer screw 115 of which engages a nut 116 fixed in an upwardly extended stump or portion 117 of the base of column 1. A clutch member 118 slidably keyed on shaft 110 is shiftable to engage or to disengage clutch teeth 118ᵃ with complementary clutch teeth 105ᵃ on the gear 105. If the clutch teeth are engaged the knee 2 may by the mechanism described, be driven in either direction and at a feed or rapid traverse rate, accordingly as shaft 74 is so driven.

The clutch members 109 and 118 are provided with annular grooves 109[b] and 118[b], and a pivoted lever 119 is provided on its opposite ends with pins or shoes 119[a] and 119[b] entering the respective grooves. The lever 119 is fixed on one end of a pivot pin 120 (see Fig. 17) to the other end of which is fixed a bevel segment 121 meshing with a bevel pinion 122, on the stem of which is fixed a lever 123 provided with a spring pressed plunger 124 which may enter suitable holes in the supporting structure to prevent movement of lever 123 or may be withdrawn by the means of a hand grip 125, in which case the lever may be shifted.

The relationship of the various parts is such that when plunger 124 is withdrawn lever 123 may be shifted in the one direction to engage the clutch teeth 109[a] with clutch teeth 101[a], or be shifted in the other direction to engage the clutch teeth 118[a] with clutch teeth 105[a].

From the foregoing it will be apparent that either the saddle or knee may be actuated in either direction and at either a feed or quick traverse rate accordingly as suitable levers are shifted, and owing to the arrangement of the transmission elements, the relative rates of the feed and rapid traverse for any given rate of the respective members 13 and 14 is determined by the gears 63 and 66.

The respective transmission trains leading from the gear 16′ to the saddle (or knee) and from the gear 16′ to the table being substantially independent, the feed rate for the movement of each of the supports will be separately determined; and since the ratio of feed to power rapid traverse is determined for each support by gearing, the ratio of which may be determined without necessarily altering any desired rate of feeds, it is apparent that any desired ratio may exist as between feed and rapid traverse for the individual supports or as between a plurality of supports. When clutch members 62 and 109 are engaged the train from the quick traverse element 62 to the saddle constitutes a branch line transmission including the quick traverse element 62 and a reverser consisting of the clutch member 73 together with its associated parts, the train being individual to the saddle and the reverser being in serial driving relationship with the quick traverse element, whereby power derived from the one is transmitted through the other. The alternative feed drive to the saddle, when engaged, similarly constitutes a train or branch line transmission individual to the saddle in which the feed member or gear 63 and the reverser are in serial driving relationship. The same remarks apply to the feed and quick traverse drives to the knee, if the clutch member 118 is engaged instead of the clutch member 109.

The hand trip shaft 77 is extended and interconnected for operation by both adjustable and fixed stops or dogs, in a manner and by mechanism here shown but previously shown and described in the above-named preceding application, whereby either the cross or the vertical movements may be automatically tripped at any desired point, or may be positively tripped before the slides can overrun and cause damage. The table movement is likewise provided with automatic trip means, effected by the adjustable dogs 85 and by positive or fixed dogs 86 adapted to contact the one or the other of projecting lugs or pins 87 and 88 fixed on the stem of the hand lever 46 and effective to bring the clutch member 40 to a central position where the power trains will be non-effective upon the table, all in a manner similar to and by means of mechanism corresponding with that disclosed and described in the preceding application previously mentioned.

Each of the levers 69 and 26 are provided at one end with cam points or detents 89 and 90 respectively, which are respectively operated upon by the spring plungers 91 and 92, the arrangement being such that when traveling in either direction, after passing the center of cam movement, the levers will be immediately urged toward a completion of the movement by the means of the spring plungers. As shown in Fig. 13, the pivoted clutch shoes 53 and 53[a] are each provided with lost motion or extra space in their slots in the rod 54, the amount of this lost motion being approximately equivalent to one-half the total movement of the levers 69 or 26.

The purpose of this lost motion is as follows: When moving from a position of the one engagement to the opposite engagement under the influence of the hand lever 52, it will be apparent that since two clutches are being simultaneously urged toward engagement, if it is necessary to engage them simultaneously, it may so happen that an interference of the one clutch member with its complementary clutch may prevent the immediate engagement of the other. This is undesirable, since it increases the difficulty of engagement. Lost motion is therefore added between the rod 54 and the pivoted shoes 53 and 53[a]. When the rod is tending to urge the clutches, it is apparent that the lost motion or space will always be in such a direction that immediately after the point of the cams or detents 89 and 90 have passed the point of their respective spring plungers, the spring plungers will then become effective to move either or both clutches quickly into engagement irrespective of further movement of the hand lever, the lost motion being of such extent that it will permit this effect. The lost motion as above described also provides that a comparatively slow movement of the hand lever by an unskilled operator may not cause the points of the clutch teeth to dwell in a position of small engagement when engaging would be detrimental to the useful life of the teeth. All the clutches are constrained by the plungers to move quickly into engagement irrespective of the rates of lever travel.

It may be noted that the construction whereby different supports are provided with an individual reverser in series with an individual feed clutch, or with an individual quick traverse clutch, or both, has a variety of advantages. In addition to the specific form of controlling mechanism herein illustrated, it renders possible a variety of other control systems not heretofore known, each of which may be advantageous for certain machines or classes of work to be performed.

Having now fully disclosed my invention in one of its preferred embodiments, I claim:

1. In a milling machine having a work support and a tool support, the combination of means for relative movement thereof in a plurality of paths, said means including a plurality of transmission trains respectively connectible for relative support movement in the different paths and each including a quick traverse clutch element and a reverser in serial power transmitting relationship.

2. In a milling machine having a work support and a tool support, the combination of means for relative movement thereof in a plurality of paths, said means including transmission trains respectively operable for the different paths and each including a shiftable quick traverse clutch element and a reverser in serial power transmitting relation, and operating mechanism interconnecting the respective quick traverse elements for simultaneous shifting movement.

3. In a milling machine having a work support and a tool support, the combination of means for relative movement thereof in a plurality of paths, said means comprising a plurality of trains respectively operable for the different paths and each including a shiftable quick traverse element and a reverser, a plurality of levers, motion transmitting connections from the respective levers to the respective reversers for their separate control, another lever, and motion transmitting connections from the last named lever to each of said quick traverse elements for their simultaneous movement.

4. In a milling machine having a work support and a tool support, the combination of means for relative movement thereof in a plurality of paths, said means comprising transmission mechanism individual to each path including a feed clutch element and a reverser in serial power transmitting relationship.

5. In a milling machine having a work support and a tool support, the combination of means for relative movement thereof in a plurality of paths, said means comprising a plurality of power trains respectively operable for the different paths and each including a shiftable feed clutch element and a reverser in serial power transmitting relation, a plurality of levers, motion transmitting connections from the respective levers to the respective reversers, another lever, and motion transmitting connections from the last named lever to each of said feed clutch elements.

6. In a milling machine having a work support and a tool support, the combination of means for relative movement thereof in a plurality of paths, said means comprising a plurality of branch line transmission mechanisms respectively connectible for such movement in the respective paths; each of said branch lines including a feed element, a quick traverse element, and a reverser in serial driving relationship with each of said elements.

7. In a milling machine, the combinations of a plurality of movable supports, a plurality of branch line transmissions respectively connectible to actuate the one or the other support; each of said branch lines including a feed element, a quick traverse element and a reverser in series, a main transmission including a plurality of members respectively movable to engage the feed elements of the different branch lines and other members respectively movable to engage the quick traverse elements of the different branch lines, a plurality of levers respectively having motion transmitting connections with the reversers of the different branch lines, and another lever having motion transmitting connections with each of said main transmission members.

8. In a milling machine, the combination of a plurality of movable supports and transmission mechanism therefor including a plurality of branch lines respectively individual to the respective supports and a main line, a plurality of clutch devices respectively operable to connect the one or the other of said branch lines with said main line, and motion transmitting connections for simultaneously operating said clutch devices to simultaneously connect said branch lines with the main line.

9. In a milling machine having a plurality of movable supports, the combination of means for relative movement thereof in a plurality of paths, said means including a plurality of branch line transmissions respectively individual to the respective supports and each including a first clutch element, gearing, a reverser, and one of said supports in series in the order named, and each including a second clutch element connected to drive the reverser of the same transmission exclusive of the gearing, said gearing being of different ratio in the different transmissions.

10. In a milling machine, the combination of a plurality of movable supports, a feed transmission, a quick traverse transmission, branch lines respectively connectible to the respective supports, a first plurality of clutch elements respectively movable for connecting one of said transmissions with the respective branch lines, a second plurality of clutch elements respectively movable for connecting the other of said transmissions with the respective branch lines and control mechanism including a lever having motion transmitting connection with each of said clutch elements.

11. In a milling machine, the combination of a plurality of movable supports, a feed transmission and a quick traverse transmission each terminating in a plurality of clutch elements, a plurality of branch line transmissions connectible to drive the respective supports and each including a first clutch element adjacent one of the terminal clutch elements of said feed transmission, a second clutch element adjacent one of the terminal clutch elements of the quick traverse transmission and gearing between said clutch elements; said branch lines each including a reverser in serial driving relationship with both of the elements; and means for engaging the adjacent clutch elements, whereby each support may be driven either from the one transmission to exclude said gearing, or from the other transmission to include said gearing and in either event in either direction by virtue of said reverses; the gearing in the different lines being of different ratio.

12. In a milling machine, the combination of three movable supports and transmission mechanism including a first branch line connectible with one of said supports and having gearing and a motion reverser in serial driving relationship, a second branch line connectible with either of the other of said supports and having gearing and a motion reverser in serial driving relationship, and a main line connectible with either of said branch lines, said gearing being of substantially different ratio in the different branch lines whereby power movement of the one support from said main line will be at a substantially different rate from the power movement of the other two supports from the same main line.

13. In a milling machine transmission and control mechanism, the combination of a plurality of transmission clutch members, a lever, motion transmitting connections from said lever to each of said clutch members for their simultaneous movement, a plurality of spring actuated detents respectively connected to the respective clutch members to urge their engagement, and lost motion means effective in said motion transmitting connections to permit one of said detents to accomplish the engagement of one of said clutch members in advance of the other.

14. In a milling machine transmission and control mechanism, the combination of a plurality of transmission clutch members, a lever, motion transmitting connections from said lever to each of said clutch members for their simultaneous movement, a plurality of spring actuated detents respectively effective on the respective clutch members to urge their engagement, and lost motion means effective in said motion transmitting connections whereby said detents may accomplish the engagement of one or of both said clutch members in advance of the movement of said lever.

15. In a milling machine having a plurality of supports, the combination of means for relative movement thereof in a plurality of paths, said means including a plurality of reverse clutches respectively effective to change the direction of movement of the respective supports, and a plurality of other clutches respectively effective to change the rate of the respective supports from a feed rate to a rapid traverse rate; and control mechanism for said clutches including a plurality of levers respectively having motion transmitting connection with the respective reverse clutches, and another lever having motion transmitting connection with all of said rate change clutches.

16. In a milling machine having a work support and a tool support, the combination of means for relative movement thereof in three transverse paths, including a first train connectible for such movement in one of said paths and having clutch means shiftable for alternative feed or quick traverse connection, together with a reverser in series with said clutch means; and a second train connectible for such movement in either of the other paths and having a clutch device shiftable for alternative feed or quick traverse connection, together with a reverser in series with said clutch device.

17. In a milling machine having a plurality of supports, the combination of means for relative movement thereof in a plurality of paths, including trains respectively connectible with the respective supports, each of said trains embodying a reverser, a plurality of clutch elements interconnected by gearing, and motion transmitting connections from one of said clutch elements to a support through said reverser; said gearing being of different ratio in the different trains.

18. In a milling machine, the combination of a plurality of movable supports, a plurality of trains respectively individual to the respective supports, a feed transmission, a quick traverse transmission, a plurality of interconnected clutch devices respectively operable to connect the respective trains with said feed transmission, and another plurality of interconnected clutch devices respectively operable to connect the respective trains with said quick traverse transmission, 19. In a milling machine, the combination of a plurality of movable supports, a plurality of trains respectively individual to the respective supports, a feed transmission, a quick traverse transmission, a plurality of clutch devices interconnected for movement to simultaneously connect both of said trains with said feed transmission, another plurality of clutch devices interconnected for movement to simultaneously connect both of said trains with said quick traverse transmission, and means operative to prevent the simultaneous connection of either of said trains with both said feed and quick traverse transmission.

20. In a milling machine the combination of two movable supports, transmission means for said supports including feed and quick traverse mechanism for effecting different rates of support movement respectively and reversing mechanism individually selective of different directions of support movement, and control devices independently operable for different of said mechanisms respectively, said transmission including means operative to effect substantially different quick traverse rates for the different supports.

21. In a milling machine the combination of a tool spindle, a spindle transmission including a power source, a clutch, a rate changer and said spindle in the order recited, three movable supports, quick traverse transmission mechanism for movement of said supports and driven from said spindle transmission at a point between said power source and said clutch, said quick traverse transmission being adapted to move at least one of said supports at a substantially reduced quick traverse rate relative to the rate of another support, feed transmission mechanism for movement of said supports and driven from said spindle transmission at a point between said clutch and rate changer, control means simultaneously selective for all said supports of said quick traverse or feed transmissions, and other control means operable independently of the first mentioned control means for controlling the direction of support movement, the last mentioned control means being operable for individually determining the direction of movement of at least one of said supports.

22. In a milling machine, the combination of three movable supports, transmission mechanism therefor including portions shiftable for simultaneously determining a feed rate or a quick traverse rate for each of said supports and other portions shiftable for determining the direction of support movement, said transmission being adapted to effect substantially reduced quick traverse rates for at least one of said supports relative to the rate of another support and arranged for one of said portions to receive power serially through the other, a first control means simultaneously determinative of said feed or quick traverse rate for all said supports, and other control means determinative of which of said supports shall be operated, the last mentioned control means being operable for individually determining the direction of movement of one of said supports.

In witness whereof I have hereto affixed my signature.

FRED A. PARSONS.